US006543550B2

(12) United States Patent
Hall

(10) Patent No.: US 6,543,550 B2
(45) Date of Patent: Apr. 8, 2003

(54) LONG RANGE ELECTRONIC GUIDANCE SYSTEM FOR LOCATING A DISCRETE IN-GROUND BORING DEVICE

(75) Inventor: Nelson Hall, Kent, WA (US)

(73) Assignee: Utilx Corporation, Kent, WA (US)

( * ) Notice: Subject to any disclaimer, the term of this patent is extended or adjusted under 35 U.S.C. 154(b) by 0 days.

(21) Appl. No.: 09/747,162

(22) Filed: Dec. 21, 2000

(65) Prior Publication Data

US 2002/0010547 A1 Jan. 24, 2002

Related U.S. Application Data

(60) Provisional application No. 60/179,171, filed on Jan. 31, 2000.

(51) Int. Cl.$^7$ .............................................. E21B 47/022
(52) U.S. Cl. ............................. 175/26; 175/45; 175/61; 324/246
(58) Field of Search ........................... 175/26, 45, 61, 175/62; 324/207.22, 207.26, 326, 345, 346; 340/853.4, 853.5, 853.6

(56) References Cited

U.S. PATENT DOCUMENTS 3,967,201 A    6/1976   Rorden
4,710,708 A  * 12/1987  Rorden et al. .............. 324/207
4,806,869 A    2/1989   Chau et al.
4,881,083 A   11/1989   Chau et al.
5,155,442 A   10/1992   Mercer
5,585,726 A   12/1996   Chau

FOREIGN PATENT DOCUMENTS

WO        WO 86/04635       8/1986

* cited by examiner

Primary Examiner—William Neuder
(74) Attorney, Agent, or Firm—Christensen O'Connor Johnson Kindness PLLC

(57) ABSTRACT

A guidance system for a drill tool (1) comprising a primary guidance package and a magnetic solenoid transmitter (9). The primary guidance package contains signal generator. The signal generator produces a signal indicative of the location of the drill tool 1. The magnetic solenoid transmitter both transmits the primary guidance data to a signal processor and emits an electromagnetic field. Using a locator (35), an operator can periodically determine the actual drill tool position by detecting the electromagnetic field. The actual position of the drill tool as determined by the electromagnetic field is used to correct for an integration error that is introduced into the drill tool position by the guidance technique used by the primary guidance package.

30 Claims, 11 Drawing Sheets

LONG RANGE ELECTRONIC GUIDANCE SYSTEM FOR LOCATING A DISCRETE IN-GROUND BORING DEVICE

This application claims the benefit from U.S. Provisional Patent Application Ser. No. 60/179,171, filed Jan. 31, 2000, the disclosure of which is hereby expressly incorporated by reference.

FIELD OF THE INVENTION

The present invention relates to an electronic guidance system and method for accurately locating a boring device, and more particularly to a wireless guidance system and method wherein the use of two guidance techniques minimizes the error in locating the boring device.

BACKGROUND OF THE INVENTION

Directional drilling refers to a type of drilling where a drill tool is directed along a predetermined path by an operator located at a boring machine. By guiding the drill tool from the drilling site, cabling, pipes, or other underground conduits may be installed with minimal disruption to the surface above the location where the borehole is being drilled. Directional drilling techniques have therefore become especially prevalent where there are obstacles on the surface that would make trenching or other conventional installation techniques impossible. For example, directional drilling techniques are especially advantageous when constructing a horizontal borehole beneath a body of water, a roadway, or buildings. Because directional drilling can proceed without regard to surface structures, it has become the chosen technique for many applications.

One direction drilling technique incorporates two guidance packages located within a drill tool. The primary guidance package comprises a triaxial magnetometer and triaxial accelerometer. The set of signals produced by the triaxial magnetometer and triaxial accelerometer are transmitted via a cable to a guidance computer and manipulated to determine the orientation of the drill tool and, by integration over the distance the drill tool has traveled, the approximate position of the drill tool during the directional drilling operation. The secondary guidance package comprises a magnetic solenoid transmitter that is placed within the drill tool. The magnetic solenoid transmitter emits an electromagnetic field having a predetermined radiation pattern. Using a locating device such as the device disclosed in U.S. Pat. No. 4,806,869 to Chau et al. (expressly incorporated herein by reference), an independent indication of the position of the drill tool can be determined. When used in conjunction, the two guidance packages ensure accurate guidance of the drill tool.

In operation, the magnetometer and accelerometer are used to guide the drill tool during the boring operation. However, the actual position of the drill tool is determined using the locating device. When the actual position is determined, errors which have crept into the calculated tool location may be removed by updating the calculated position of the drill tool to equal the actual drill tool position. By eliminating the integration error, the predetermined boring path may be more accurately followed.

Although the use of this system may provide a more accurate means for locating a boring device, it has a significant drawback in that a cable is required to transmit the data from the primary navigation package. The use of this cable has several disadvantages. As a drilling run proceeds, drill rods must be added to create a drill string. Each time a drill rod is added to the drill string, the wire must be extended to accommodate the increased length of the drill string. Extending this wire is time-consuming, thereby greatly reducing productivity.

A second disadvantage of using a cable is that it may fail or short to a drill rod. This greatly reduced the reliability of the guidance system, and should a failure of this type occur, substantial time may be required to correct the fault.

A third disadvantage of the use of a cable to transmit data from the primary navigation system is that a drill operator's safety may be in jeopardy. The act of extending the cable each time that a drill rod is added to a drill string requires the operator to be in close proximity to the drill machinery for a longer period of time; therefore, this reduces the margin of safety for the operator.

Attempts to eliminate the cable connection for transmitting navigational data have had little success. One such method transmits data through a circuit made up of the drill pipe with the return electrical path being the earth. This unit is powered by an internal battery pack. A problem with this method is that it has a very limited range, which in turn limits the maximum length of a drilling run.

Another method of wireless guidance of a boring device is called mud pressure pulsation. Currently, its use is impractical for medium to small drilling rigs due to its large size and high cost. These systems are typically used with oil drilling rigs. Wireless guidance systems that transmit navigational data from magnetometers and gravity vector sensors exist, but the current level of development makes their use impractical because of their limited range.

There exists a need for a wireless guidance system that can be used to accurately guide a drilling device along a predetermined drilling path. The system needs to have a long enough range, yet be small and cost-effective so as to be practical for use for medium to small range drilling rigs.

SUMMARY OF THE INVENTION

In accordance with one embodiment of the invention, a wireless electronic guidance system for accurately locating an in-ground boring device is provided. The system includes a primary guidance package for indicating the position of the boring device and a secondary guidance package for indicating the position of the boring device. The secondary guidance package includes a magnetic solenoid transmitter for both transmitting data from the primary guidance package and emitting a signal from the secondary guidance package to a data receiver for receiving the guidance data. The primary guidance package and secondary guidance package are all coupled to the boring device. The magnetic solenoid transmitter has the capability of transmitting the data from the primary guidance package and the secondary guidance package a distance of at least 100 feet. The data receiver is typically mounted above ground and near the drill operator.

In an embodiment of the invention, the primary guidance package contains accelerometers and magnetometers. The signals from the primary guidance package are used to calculate pitch and roll orientation from the gravity vector sensor, and orientation to the magnetic north pole from the magnetometers. This data is then transmitted via the magnetic solenoid transmitter to the data receiver for calculation of the location of the boring device.

In another embodiment of the present invention, the secondary guidance package containing the magnetic solenoid transmitter generates an electromagnetic field having a predetermined radiation pattern. A locator that locates the electromagnetic field is positioned above ground. The locator detects the electromagnetic field transmitted from the magnetic solenoid transmitter and determines the actual position of the boring device.

In still another embodiment of the invention, the magnetic solenoid transmitter is of a length such that the magnetic flux density of the signal emitted from the magnetic solenoid transmitter is sufficient to be received by the data receiver at distances of at least 100 feet. Contrary to what was known by someone skilled in the art, as the length of this magnetic solenoid transmitter increases, the flux density of the emitted signal increases. In an embodiment of the invention, the length of the magnetic solenoid transmitter is at least eight inches.

In yet another embodiment of the invention, the wireless transmitter is a magnetic solenoid transmitter having at least two magnetic solenoid transmitters co-axially aligned and operating as one single, in-phase magnetic solenoid transmitter. Typically, the transmitter will have two coaxially aligned magnetic solenoid transmitters of length of at least eight inches to provide transmission of data from both the primary guidance package and secondary guidance package to the data receiver over distances of at least 100 feet.

In a further embodiment of the invention, a method is provided for accurately guiding an in-ground boring device along a predetermined bore hole path by monitoring its location along the path. The boring device contains both a primary guidance package and a secondary guidance package. The method includes receiving the data from the primary guidance package from a magnetic solenoid transmitter having a length of at least eight inches, calculating the position of the boring device, guiding the boring device along the predetermined path based on that calculated position, receiving data from the secondary guidance package from the magnetic solenoid transmitter having a length of at least eight inches, calculating a second position of the boring device, and setting the position calculated based on data from the primary guidance system equal to the position based on data gathered from the secondary guidance system to remove any error present in the first calculated position.

In still a further embodiment of the invention, a longer magnetic solenoid transmitter is incorporated with current drilling techniques to increase the length of transmission of guidance or location data. The current drilling techniques can benefit from and increase in field strength with out an accompanying increase in required power.

In yet another embodiment of the invention, a magnetic solenoid transmitter comprising at least two magnetic solenoid transmitters co-axially aligned to operate as a single, in phase transmitter is incorporated with current drilling techniques to increase the length of transmission of guidance or location data. The current drilling techniques can benefit from and increase in field strength without an accompanying increase in required power.

The present invention has many advantages. The elimination of any wire or cable connection to a data receiving computer addresses the long-unsolved problem of having to extend the length of the wire or cable connection as the length of the drill string increases, worrying about the wire or cable shorting against the inside of a drill rod or becoming disconnected, and placing the operator in a position of potential danger. The invention is also a simplified guidance system by transmitting both the primary guidance package data and the secondary guidance package data over a single transmitter. Furthermore, the need to correct the calculated position based on data from the primary navigational package is reduced; thus, the system operates more efficiently and economically than other wireless systems. This advantage also permits guidance of the boring device with greater accuracy due to the long range transmitting capability of the transmitter in areas where location of the boring device using the secondary guidance package is unfeasible.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
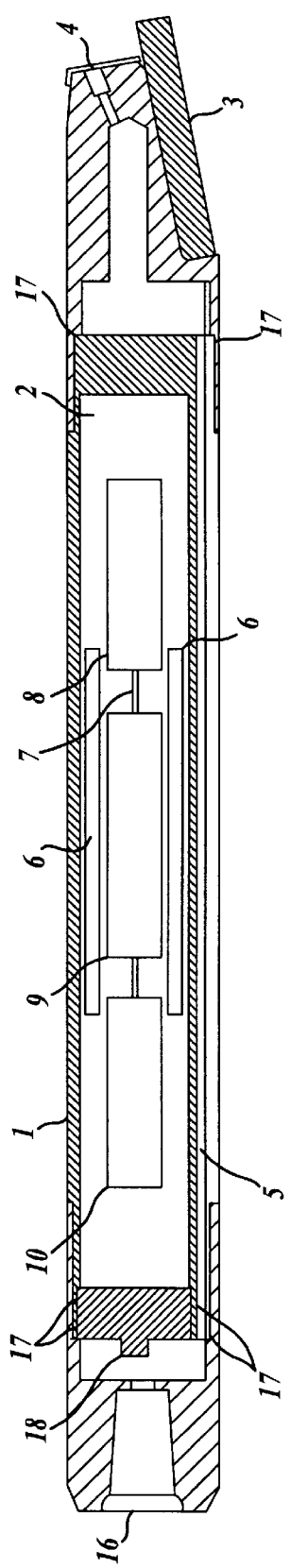
FIG. 1 is a sectional view of the underground drilling tool showing the accelerometers, magnetometers, transmitter, and power source.

An embodiment of the invention provides a wireless guidance system and method for guiding a boring device along a predetermined path. Referring to FIG. 1, a sectional view of the underground drilling tool 1 is shown. The tool is made up of the drill pipe attachment point 16, the electronics compartment 2, and the tool head with steering surface 3. The tool head also includes high pressure fluid cutting jets 4. The fluid is supplied by the fluid channel 5. The electronics compartment 2 contains a battery power source 10, a triaxial accelerometer and triaxial magnetometer 8, and a wireless transmitter 9. Access is gained to the inside of the tool via removable threaded sections 17, 18. The tool body, tool head, and drill pipe closest to the tool body is made of a non-magnetic material, usually non-magnetic steel alloy, to prevent interference with the magnetometers. The non-magnetic steel alloy tool body has slots 6 through it that allow the magnetic field produced by the transmitter to extend beyond the tool and reach the receiver. In drilling applications that do not incorporate magnetometers, any common steel alloy is suitable.

A primary guidance package contains a triaxial accelerometer and a triaxial magnetometer. The triaxial accelerometer consists of three accelerometers, each oriented in the drill tool along an axis of the X'Y'Z' coordinate system. Accelerometers for this application can be manufactured by Allied Signal Corp, however, one skilled in the art would recognize other similar accelerometers may be used. Similarly, the triaxial magnetometer consists of three magnetometers, each oriented along an axis of the X'Y'Z' coordinate system. Magnetometers manufactured by Applied Physics Labs provide sufficient accuracy for the disclosed method although similar manufactured magnetometers may be used. A downhole microprocessor (not shown) within the primary guidance package converts the signals from the triaxial accelerometer and triaxial magnetometer into a format for transmission to the surface. A transmitter allows the downhole microprocessor to transmit the data to a receiver antenna 27 and data receiver 26 located on the surface. The transmitter is typically a magnetic solenoid transmitter 9. The magnetic solenoid transmitter 9 can transmit the primary guidance package data over a distance of at least 100 feet. The transmitter can typically transmit primary guidance package data at distance over 160 feet. The magnetic solenoid transmitter 9 is explained in greater detail below.

A secondary guidance package within drill tool 1 contains a magnetic solenoid transmitter. The magnetic solenoid transmitter generates an electromagnetic field surrounding the drill tool 1. The field is modulated at a rate falling within a range of a few hundred hertz to a few hundred kilohertz, with the typical operating range falling within 8 kHz to 90 kHz. The magnetic solenoid transmitter both transmits the primary guidance package signal and emits the electromagnetic field.

The guidance data gathered by the gravity vector sensor and the magnetometers along with other data such as tool temperature and battery voltage are transmitted from the magnetic solenoid transmitter using signal modulation. The modulation method must be selected such that the magnetic transmission can be used both by the data receiver and display to receive the data from drilling tool transmitter and by a walkover location system to directly locate the tool underground.

The magnetic solenoid transmitter 9 of the present device includes magnetic solenoid transmitters of lengths greater than 5 inches. Preferably, the magnetic solenoid transmitter is 8 inches in length. The magnetic solenoid transmitter 9 of eight inches can transmit guidance or location data a minimum of 100 feet. The downhole tool slots 20 of the present device includes slots lengths greater than 10 inches. As a non-limiting example, the slots in the present device are 13 inches in length.

Figure 10:
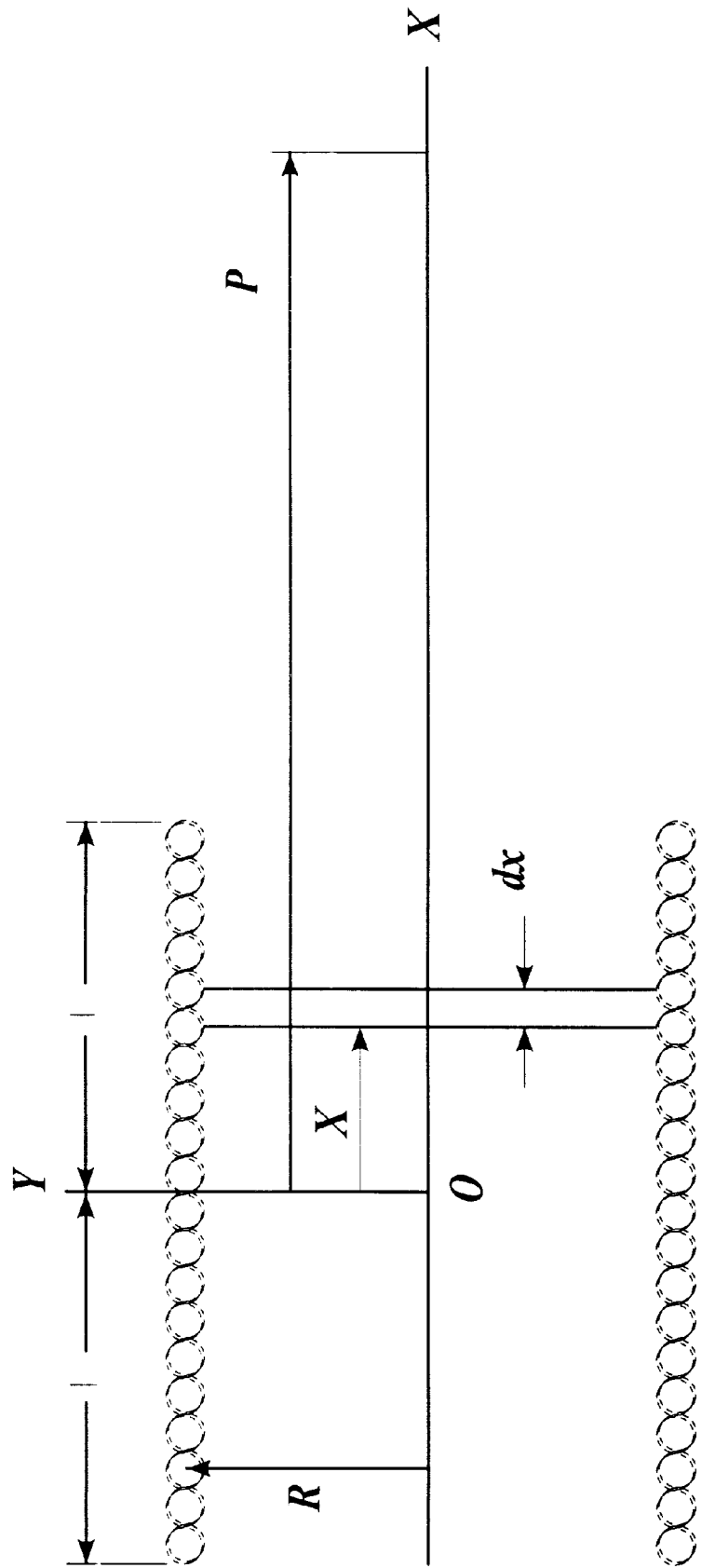
FIG. 10 shows a coil or solenoid having N turns per unit length, each carrying a current I.

Referring to FIG. 10, it is generally known that a field strength B at any point within a closely wound solenoid and along the axis of the solenoid is given by the equation 1:

$$B = \mu_0 n I$$

where $\mu_0$ is the permeability constant in vacuum, n, is the number of turns per unit length, and I is the current. See Sears, Francis and Zemansky, Mark, *University Physics; Electricity and Magnetism, Optics, and Atomic Physics*, p. 597 (eq. 33-8), (2nd Ed. 1955).

One embodiment of the invention expands upon the above principle. As can be seen from this equation, neither the length L of the solenoid nor the radius R of the solenoid has an effect on the field strength B at a point on axis, inside the solenoid (it is assumed for the above equation that the length L is substantially greater than the radius R; in this particular case, is greater than R by at least a factor of 10). However, this is an incorrect representation of the field strength at a point outside of the solenoid. The above equation is unable to accurately describe the effect the length L on the field strength B at a distance P to a point on the axis outside the magnetic solenoid transmitter. Moreover, the effect of length L on field strength B varies as the distance to POINT P from the Y axis increases. See FIGS. 11a, 11b, and 11c.

The following equations demonstrate that the length L of a solenoid does affect the field strength B. Referring back to FIG. 10, a solenoid transmitter is shown having n turns per unit length each carrying the current I. The radius of each of the individual coils is R, and the length is 2L. The flux density or field strength on the axis of a solenoid of finite length is obtained from the Biot-Savart Law. The field strength on the axis at a distance P from the origin due to a single loop at x is:

$$B = \frac{\mu_0 \cdot I \cdot R^2}{2 \cdot [(P-x)^2 + R^2]^{\frac{3}{2}}}$$

See Halliday, David and Resnick, Robert, *Physics Parts I and II Combined*, pp. 758–761 (eq. 34-11), (3$^{rd}$ Ed. 1978).

The field on the axis due to all of the loops that are within a small increment dx is:

$$dB = \frac{\mu_0 \cdot n \cdot I \cdot R^2 \cdot dx}{2 \cdot [(P-x)^2 + R^2]^{\frac{3}{2}}}$$

The total field at distance P from the origin (center of solenoid), on the axis is:

$$B = \frac{\mu_0 \cdot n \cdot I \cdot R^2}{2} \cdot \int_{-L}^{L} \frac{1}{[(P-x)^2 + R^2]} dx$$

Integration yields:

$$B = \frac{\mu_0 \cdot I \cdot n}{2} \cdot \left[ \frac{L-P}{\sqrt{(P-L)^2 + R^2}} + \frac{L+P}{\sqrt{(P+L)^2 + R^2}} \right]$$

Figure 11A:
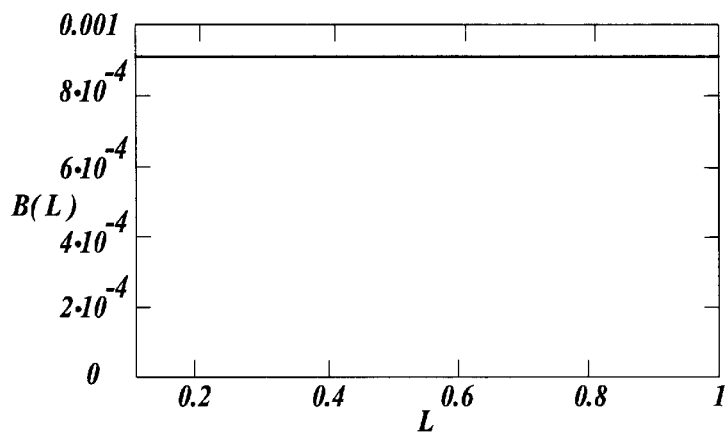
FIGS. 11A, 11B, and 11C show an increase in field strength as the length of a magnetic solenoid transmitter increases when measured at a point outside the solenoid.
Figure 11B:
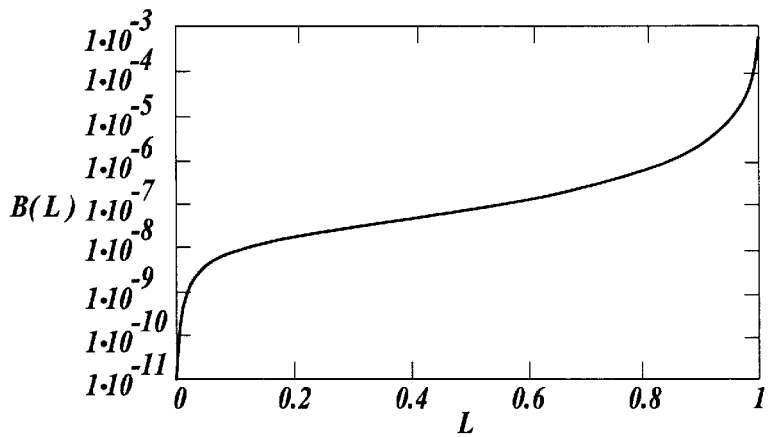
Figure 11C:
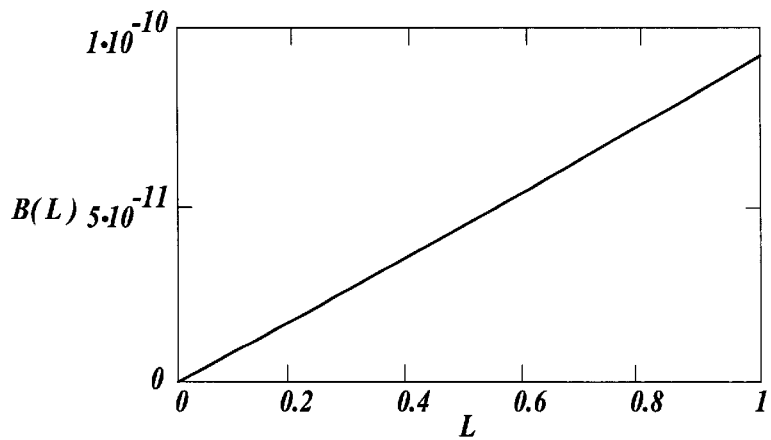

This result is shown graphically in FIGS. 11a, 11b and 11c. FIG. 11a shows field strength B vs. solenoid length L taken at a point on the X and the Y axis of the magnetic solenoid transmitter with I, n, and R held constant. FIG. 11a demonstrates the results one would expect after analyzing equation 1 above. In fact, at P=0 feet and length L at least a magnitude of 10 greater than radius R, the equation reduces to original equation 1, and the field strength B remains constant. FIG. 11b, however, shows that field strength B begins to increase at a point outside the magnetic solenoid transmitter as the length of the solenoid increases. FIG. 11c shows the field strength B dramatically increases with an increase in length L of the solenoid as one move farther from the X, Y origin as shown in FIG. 10.

Looking at FIGS. 10 and 11c, when P>>R and P>>L (as is the case shown in FIG. 11) the magnetic solenoid transmitter field strength increases in approximately proportionally to the length of the magnetic solenoid transmitter. The equation for B can therefore be simplified:

$$B \sim KL$$

where P>>R, P>>L, I and n constant.

Although this derivation is for a solenoid with an air core, the result is essentially the same for cores of higher permeability such as ferrite. The following empirical data taken from a ferrite core antenna field strength test verifies this:

| Antenna Length | Normalized magnetic flux density @ 10 feet |
|---|---|
| 1.25 in. | 1.0 |
| 7.5 in. | 3.9 |

There has existed a long felt need for increased field strength to permit wireless monitoring of a drill tool while maintaining a minimum power requirement. The above equations show that this can be accomplished economically through the use of a longer magnetic solenoid transmitter to transmit guidance or location data.

Figure 2:
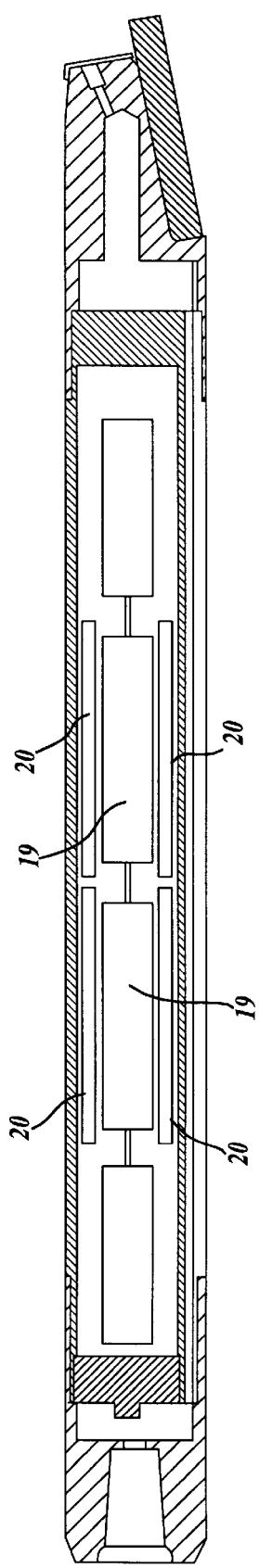
FIG. 2 is a sectional view of the underground drilling tool showing the transmitter as two coaxially aligned magnetic solenoid transmitters.

A disadvantage to using the long magnetic solenoid transmitter and long slots is that the long slots reduce the structural strength of the downhole drilling tool. FIG. 2 shows an alternative embodiment of the magnetic solenoid transmitter. The magnetic solenoid transmitter comprises at least two co-axially aligned magnetic solenoid transmitters 19 and at least two sets of downhole tool slots 20 which operate together as one, single magnetic solenoid transmitter which is effectively longer than either single magnetic solenoid transmitter. Empirical data has shown an increase in field strength of 2.0 times using two magnetic solenoid transmitters as compared to one (all other variables held constant). In this test case, each magnetic solenoid transmitter in the two transmitter system was of equal physical length to the transmitter in the single transmitter system. In the multiple transmitter system, slot length is reduced for a given effective transmitter length. Shortening the slots adds needed strength to the downhole tool. The magnetic solenoid transmitter must be energized such that their magnetic fields are in-phase with one another. That is, if at a given instant in time one magnetic solenoid transmitter has a north pole on its right side (FIG. 2), the other magnetic solenoid transmitter must also have a north pole on its right side. Two or more transmitters can be used in this way to increase field strength and range.

Another alternative embodiment of the invention substitutes a non-conductive, non-magnetic material for the non-magnetic steel alloy used in the tool body. One example of this material is plastic. The non-magnetic steel alloy often used in the construction of the tool body conducts electricity. The magnetic solenoid transmitter induces eddy currents into the tool body, which in turn retransmits back to the transmitter. This effectively lowers the efficiency of the transmitter. By replacing the tool material closest to the magnetic solenoid transmitter with a non-conductive material, this loss is eliminated. Slots are not required with this method since the non-conductive, non-magnetic material is transparent to magnetic fields. This solution may be used with transmitters with any number of solenoids.

In a further embodiment of the present invention, a low power input magnetic solenoid transmitter can transmit signals over 100 feet. The power input of the present invention is suitably 0.6 watts. Low power input magnetic solenoid transmitters typically have power inputs in the range of at least 0.2 watts to 1.2 watts.

Figure 3:
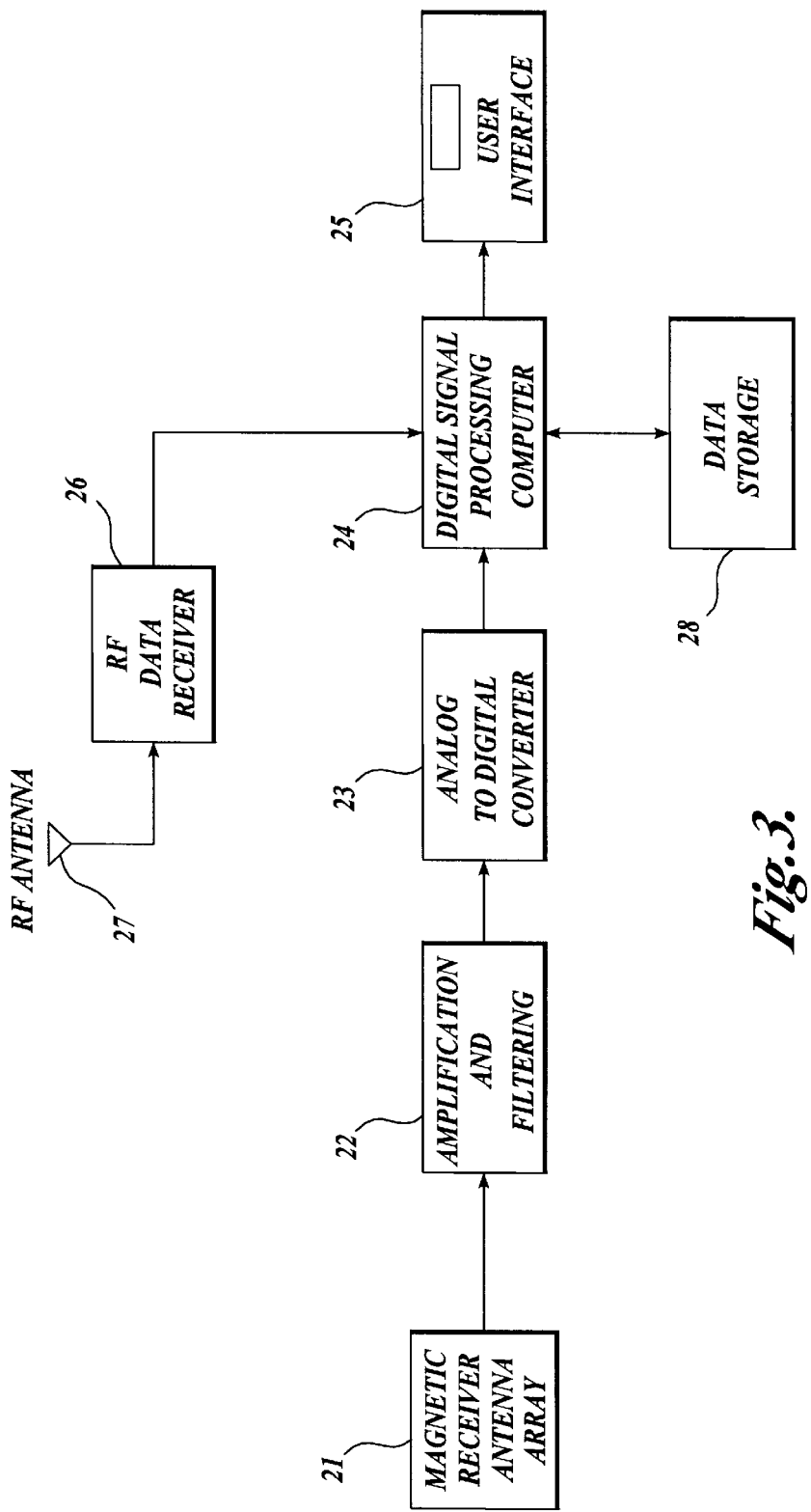
FIG. 3 is a block diagram of the function of the data receiver and display.

A block diagram of the data receiver and display is shown in FIG. 3. The magnetic receiver antenna array 21 picks up the signal from the downhole magnetic transmitter. The antenna array is preferably omnidirectional for maximum utility. It is then amplified 22 to a level suitable for the analog-to-digital converter 23. Digital signal processing techniques are applied 24 to increase the selectivity of the receiver and to demodulate the navigational data. The signal processor also calculates the drilling tool position from the navigational data. If the signal is too weak from the magnetic transmitter and a repeater has been employed, the RF receiver 26 and antenna 27 retrieve the RF signal from the repeater. A user interface 25 displays the desired drill path and the path calculated from the navigational data. The user may also enter data including the desired drill path and position corrections from the walkover locator. A data storage device 28 is employed to store the desired and resulting drill paths. The data may be retrieved at a later time. Power may be derived from the drilling apparatus or from a battery supply.

Figure 4:
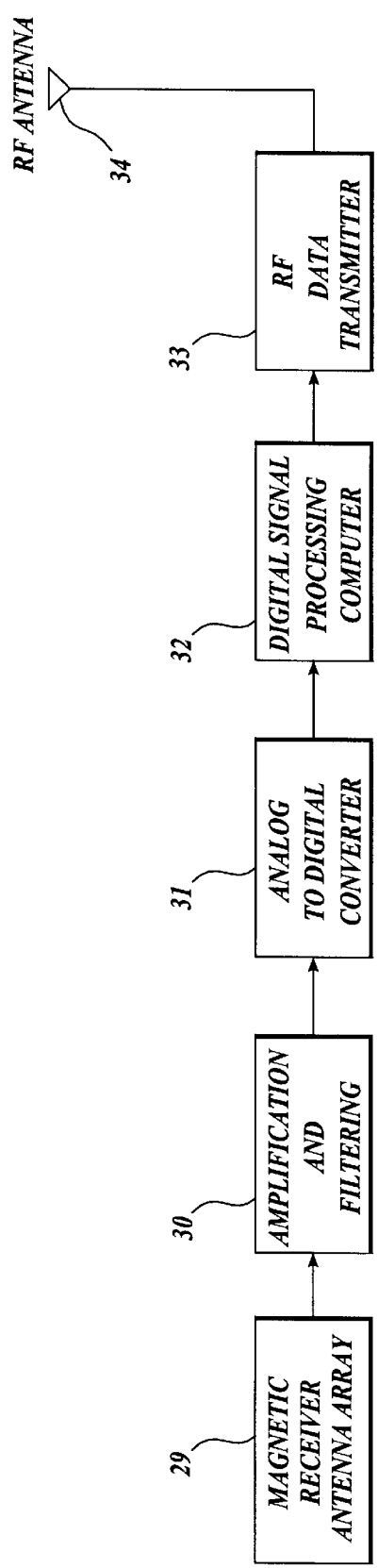
FIG. 4 is a block diagram of a data repeater and display.

A block diagram of the data repeater and display is shown in FIG. 4. Blocks 29, 30, 31, and 32 act in a similar fashion to those described for the data receiver. The demodulated data from the signal processor is then retransmitted on an RF carrier by 33 and 34. The unit is portable and powered by an internal battery supply. A suitable data repeater for use in this application is the Flowmole MWD Guidance System.

Figure 6:
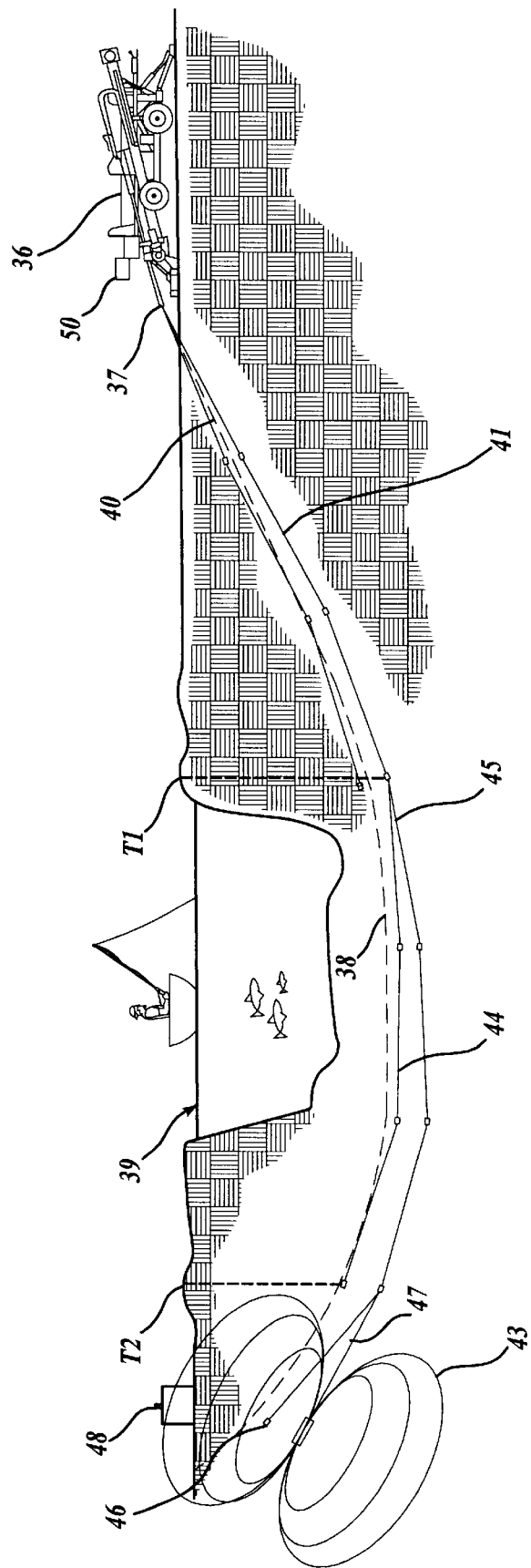
FIG. 6 illustrates the use of the guidance system provided by the invention.

FIG. 6 illustrates the situation that occurs when the drilling operation takes the downhole tool and transmitter beyond the range of the data receiver/display as described in the introduction. The data receiver 36 is deployed to receive the signal from the downhole transmitter and then relay it to the data receiver via an RF link.

One skilled in the art recognizes that any medium to small scale direct drilling technique can use a longer length magnetic solenoid transmitter or a magnetic solenoid transmitter with at least two magnetic solenoid transmitters to increase the distance of transmission of guidance or location data. An example of use of the long magnetic solenoid transmitter or the at least two co-axially aligned magnetic solenoid transmitters for steering a drilling tool is shown below.

Figure 5:
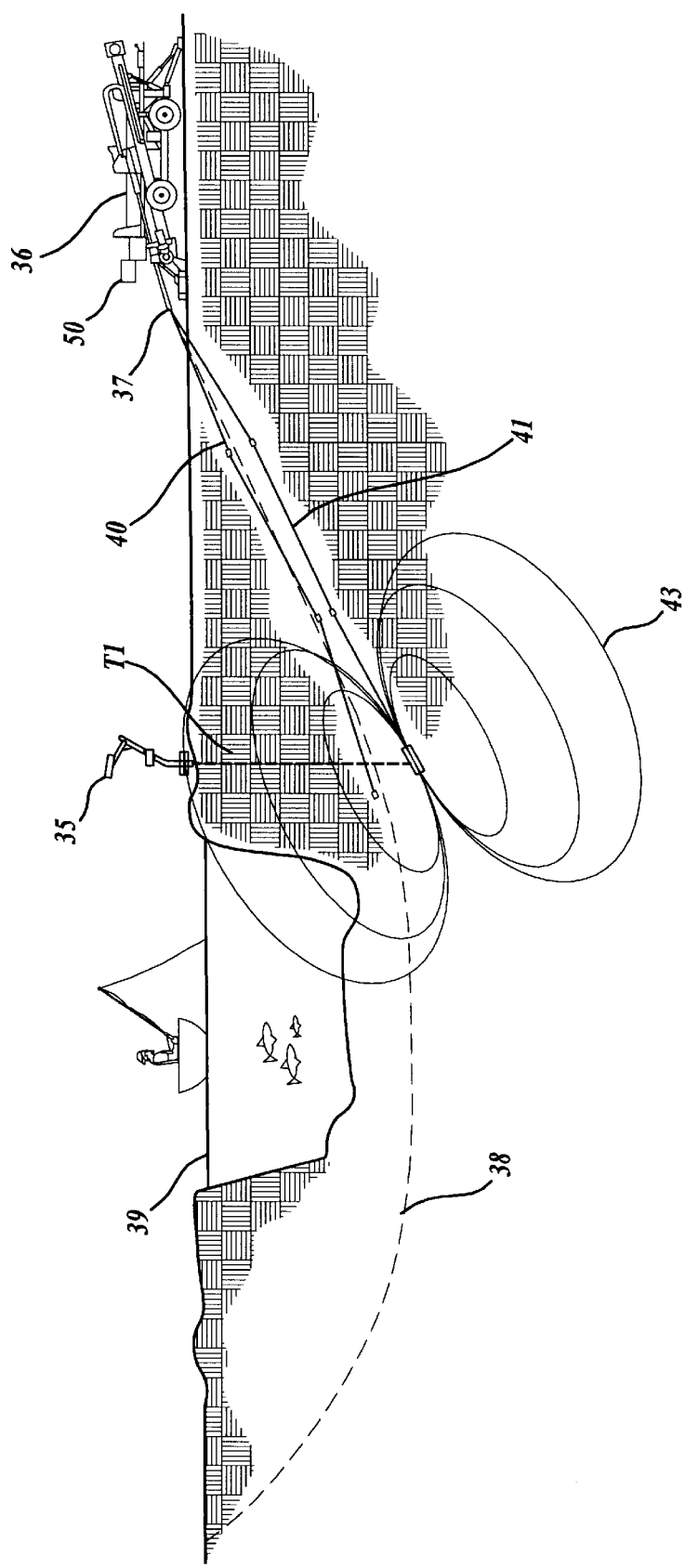
FIG. 5 illustrates the use of a locating device to obtain an independent indication of the position of the drilling tool.

A wireless guidance system for an underground drilling tool that relies on magnetometers and accelerometers to determine the location of the drill tool will typically generate an integration error that increases as the drilling tool moves farther from the boring machine. To aid in understanding the effect of this integration error, FIGS. 5 and 6 show a cross section of a typical drilling site using directional drilling techniques. For purposes of clarity, FIGS. 5 and 6 only show the effect of an integration error on the depth of the borehole. It will be appreciated, however, that the integration error will have an analogous effect on the lateral path of the borehole. Although discussed in the context of depth, the general techniques described herein are equally applicable to minimizing the effect of an integration error on a lateral borehole path deviation.

With reference to FIGS. 5 and 6, a representative boring machine 36 is shown. Boring machine 36 has a movable carriage that is capable of rotating and advancing a drill pipe 37 under the control of a drilling control system 100. As a number of drill pipes 37 are mated together, a drill string is created, extending from the boring machine located on the surface to drill tool 1 (not shown) in the ground. As a primary guidance package, the drill tool 1 is equipped with a triaxial magnetometer and a triaxial accelerometer to guide the drill tool 1 approximately along a predetermined path. Those skilled in the art will recognize that many types of boring machines exist which can be used to selectively advance and steer the drill tool 1 in a directional drilling operation.

Boring machine 36 sits on the earth's surface. As shown in FIGS. 5 and 6, a predetermined path 38 of a borehole is indicated under a body of water 39. The coordinates of the predetermined path 38 are precalculated and stored within drilling control system 100. The advantage of being able to direct a drill in a predetermined path 38 beneath the body of water 39 is that it is not necessary to use trenching or other disruptive means to install a pipe or conduit. The predetermined path 38 is representative of a drilling path that may be taken beneath the body of water 39, but is exaggerated in the drawing in terms of curve and depth at which a borehole would typically be constructed. Overlaying the predetermined path 38 is a calculated path 40 and an actual path 41. The calculated path 40 is based on an integration of the drill tool's accelerometer and magnetometer signals as the drill tool 1 advances, and includes an integration error. The generation of the integration error may be better understood with reference to FIGS. 7A, 7B, and 8.

Figure 7B:
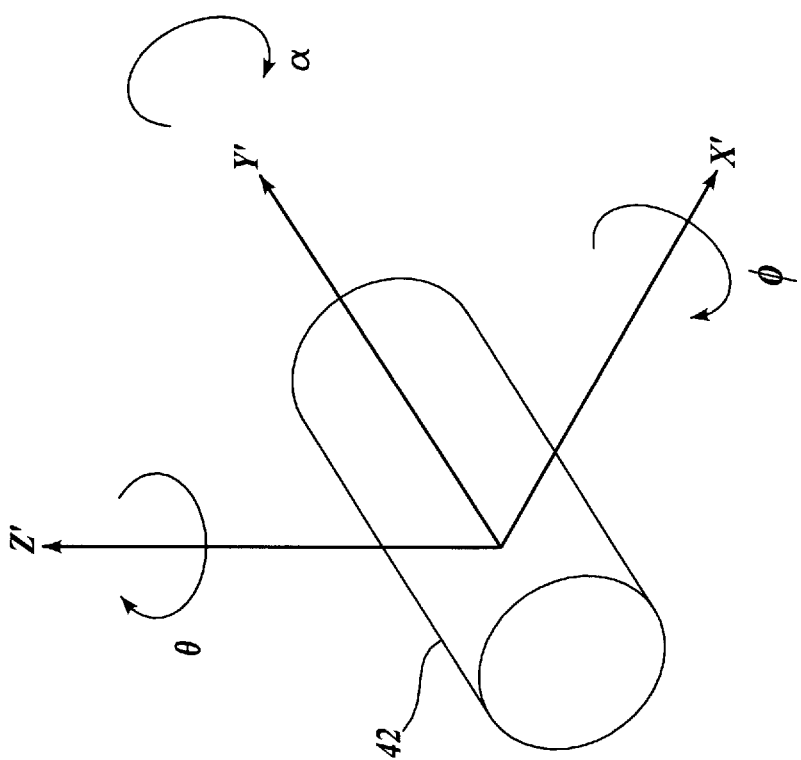
FIGS. 7A and 7B show the coordinate conventions used to describe a boring device's position beneath the earth's surface.
Figure 7A:
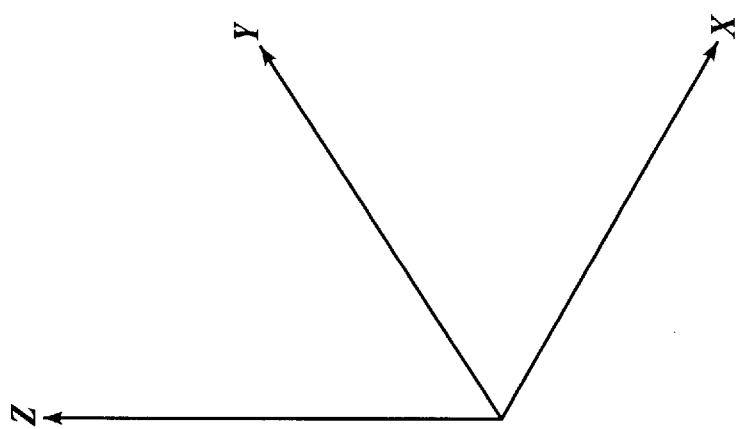

FIGS. 7A and 7B show the coordinate conventions used hereinafter to describe a drill tool's position beneath the earth's surface. FIG. 7A is a reference coordinate system, with the X and Y coordinates describing a location on the surface of the earth (over typical drilling distances, the surface of the earth may be approximated as a flat surface), and the Z coordinate describing a distance above or below the surface of the earth. The X axis, the Y axis, and the Z axis are all orthogonal. FIG. 7B shows a relative coordinate system that accompanies a drill tool 1, represented as a cylinder 42. The Y' axis extends along the drill tool path, axially of the tool, and the X' axis and the Z' axis are orthogonal with respect to the Y' axis. When determining the orientation of the drill tool 1, there are three characteristic movements that are generally described. The first is a change in heading or azimuth of the drill tool 1, indicated by the drill tool 1 rotating around the Z' axis as shown by the angle $\Theta$. The second movement is a change in the drill tool 1 pitch or inclination. A change in pitch is indicated by a rotation around the X' axis, as indicated by the angle $\phi$. The third and final movement of the drill tool 1 is the roll of the drill tool 1, indicated by a motion around the Y' axis as shown by angle $\alpha$.

Figure 8:
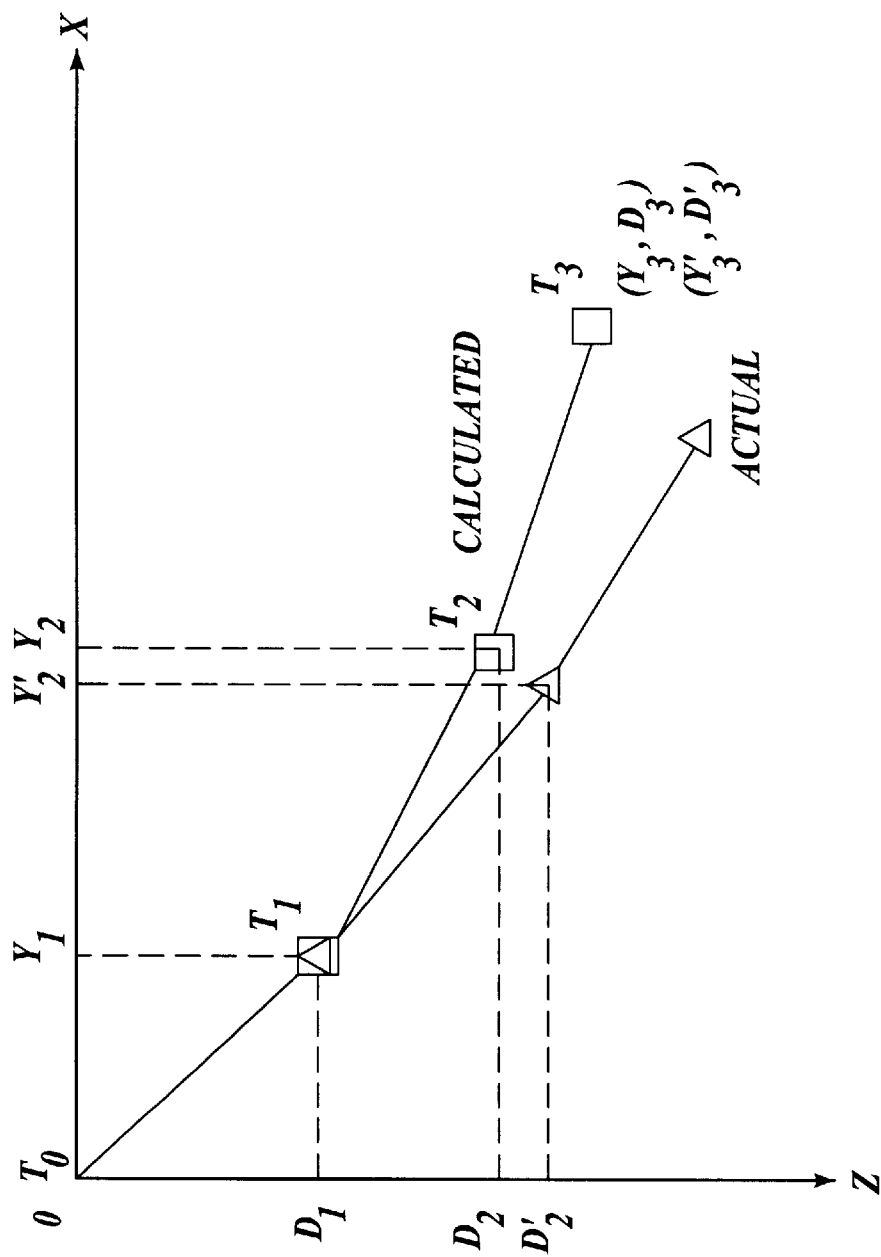
FIG. 8 is a simplified graph of the Y and Z components of a boring device path.

FIG. 8 is a simplified graph of the Y and Z components of a drill tool 1 path. As with FIGS. 5 and 6, however, the discussion that follows applies equally to the lateral components (i.e., X components) of the drill tool path. At time $t_0$, the drill tool 1 remains on the surface of the earth at the desired entry point. During the initial drilling phase, the drill tool 1 travels a certain horizontal distance and a certain depth beneath the surface of the earth. At time $t_1$, the drill tool 1 has $$\alpha = \arctan\left(\frac{G_{x'}}{G_{z'}}\right)$$

$$\Phi = \arctan\sqrt{\frac{G_{x'}^2 + G_{y'}^2}{G_{y'}}}$$

traveled a horizontal distance $Y_1$ and has descended a depth $D_1$. During the directional drilling locating phase, the calculated position of the drill tool 1 at time $t_1$ is determined. The triaxial accelerometer mounted on the drill tool 1 includes three accelerometers that measure the gravitational force in the Y', X', and Z' directions, respectfully designated $G_{x'}$, $G_{y'}$, and $G_{z'}$. Using the signals from the three accelerometers, the drill tool 1 pitch and roll angles may be determined from the following relationships:

The azimuth angle cannot accurately be measured with the accelerometers since the gravity force vector is parallel to the Z' axis during normal horizontal drilling. However, using the signal from the magnetometers in conjunction with the accelerometers, it is possible to calculate the heading of the drill tool 1. The triaxial magnetometer contains three magnetometers that are sensitive to the nearest magnetic field. Each magnetometer produces a DC voltage proportional to the magnitude of the component of the magnetic field that is normal to the pick-up coil of the magnetometer, respectfully designated $H_{x'}$, $H_{y'}$, and $H_{z'}$. Using the following relationship, the azimuth of the drill tool 1 may be calculated:

$$\Theta = \arctan\left[\frac{G \cdot (G_{z'} \cdot H_{x'} - G_{x'} \cdot H_{z'})}{-H_{y'} \cdot G^2 + G_{y'}^2 \cdot H_{y'} + G_{x'} \cdot G_{y'} \cdot H_{x'} + G_{y'} \cdot G_{z'} \cdot H_{z'}}\right]$$

$$G = \sqrt{G_{x'}^2 + G_{y'}^2 + G_{z'}^2}$$

In this manner, the instantaneous roll, inclination, and heading of the drill tool 1 may be determined. In order to find the absolute location of the drill tool 1 within the XYZ coordinate system, the drill tool 1 azimuth and inclination may be transposed from the drill tool 1 coordinate system and integrated over the length of the drill tool 1 path. The distance the drill tool 1 has traveled may be determined by the number of drill pipes 37 that have been mated to form drill string. Since each section of drill pipe is of a known length (10 feet in a embodiment of the invention), the sum of the lengths of all the pipes will determine the distance the drill tool 1 has traveled. The integration of the signals over the distance the drill tool 1 has traveled gives a fairly accurate indication of the path of the drill tool 1 and the resulting location within the XYZ coordinate system. The technique of locating a drill tool 1 based upon accelerometer and magnetometer signals is well-known in the art.

Returning to FIG. 8, at time $t_2$ the drill tool 1 is halted, and the position of the drill tool 1 calculated. Due to the integration error that creeps into the position calculation, although the calculated position of the drill tool 1 places it at coordinates $(Y_2, D_2)$, the actual position of the drill tool 1 is at $(Y_{2'}, D_{2'})$. The error between the actual and the calculated position continues to increase the farther the drill tool 1 is advanced. At time $t_3$ the calculated position is $(Y_3, D_3)$. In general, the magnitude of the error caused by integration can be calculated by the following relationship:

$$\varepsilon = \sqrt{(Y_n - Y_{n'})^2 + (D_n - D_{n'})^2}$$

The integration errors introduced in the locating phase cause the calculated drilling path to diverge from the actual drilling path. It should be noted that the divergence is greatly exaggerated in FIGS. 5 and 6.

Accelerometer and Magnetometer data are modulated onto the magnetic solenoid transmitter 9. The modulated signal is received, amplified and converted from analog to digital and demodulated in blocks 21, 22, 23 and 24 of FIG. 3. Computer 24 also determines the approximate position of the downhole tool by calculating the pitch, roll, and azimuth of the drill tool and integrating the pitch and azimuth over the distance traveled by the drill tool. During the course of the drilling operation, the downhole transmitter may go out of range of the data receiver and display as shown in FIG. 6. Data Repeater 36 may then be employed to receive the magnetic transmission from the downhole transmitter and then relay it back to the data receiver and display via RF carrier.

FIGS. 5 and 6 illustrate the use of the guidance system of the present invention, and more particularly, the use of the secondary guidance package to minimize errors generated by the primary guidance package.

The method of using the locator to minimize the error introduced in the measurement of the position of the drill tool is shown in FIGS. 5 and 6. FIG. 5 shows a profile of a drill site, with a locator being used to accurately determine the position of a drill tool at a time $t_1$. Locator 35 is positioned along the predetermined path at the approximate distance from the boring machine where the drill tool is located. A magnetic transmitter field 43 is emitted by the magnetic solenoid transmitter in the drill tool, and detected by locator 35 on the surface above the drill tool. When the depth and lateral displacement of the drill tool has been calculated by locator 35, the actual position of the drill tool is transmitted or otherwise provided to the drilling control system located at the boring machine. Using the accurate position, an operator may correct the calculated position of the drill tool as determined by the primary guidance package. In this manner, the calculated position of the drill tool can periodically be corrected to correspond to the actual position of the drill tool. That is, any accumulated integration error may be periodically set to zero by accurately locating the position of the drill tool using locator 35.

A profile of a representative path of the drill tool using the system and method described herein is shown in FIG. 6. At time $t_1$, the calculated and the actual positions of the drill tool are diverging. The use of locator 35 removes the integration error, and resets the calculated position to the actual position. The path of the drill tool is then adjusted based on the corrected position. After time $t_1$ the calculated position follows a path 44 and the actual position follows a path 45. Again, the integration error begins to creep into the calculated position of the drill tool, causing the paths to slowly diverge. At a time $t_2$, locator 35 is again used to accurately determine the drill tool position. The calculated position of the drill tool is reset to the actual position, and drilling commences again following an adjusted drill tool path determined from the corrected coordinates. Following time $t_2$, the drill tool is directed based on a calculated path 46, but follows an actual path 47. As a result of determining the position of the drill tool using the secondary navigation package at times $t_1$ and $t_2$, the actual path 47 more closely tracks the desired path 38. The accuracy of the resulting borehole is therefore improved over a borehole created using only the primary guidance package.

Figure 9:
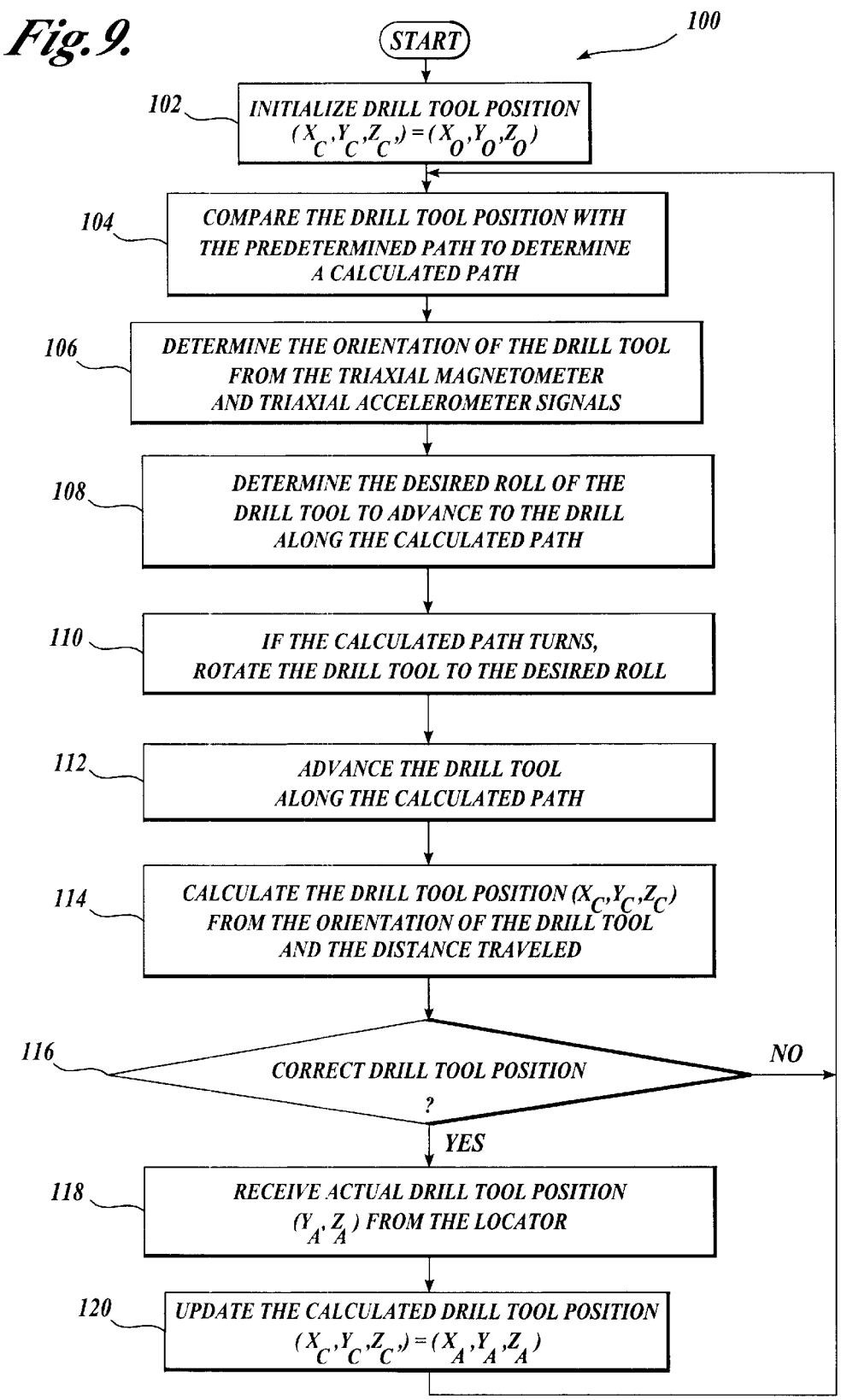
FIG. 9 is a flow chart of a computer program suitable for implementing the method of guiding a boring device along a predetermined path.

FIG. 9 is a flow chart of a computer program 100 suitable for implementing the method disclosed herein in the drilling control system 100. At a block 102, the coordinates of the drill tool are initialized to $(X_o, Y_o, Z_o)$, corresponding to the location of the boring machine. At a block 104, the position of the drill tool is compared with a predetermined path that has previously been plotted and stored in the drilling control system. Based on the current position of the drill tool, a path is calculated that will follow the predetermined path or will return the drill tool to the predetermined path if the drill tool has strayed from the desired path.

After determining the calculated path that the drill tool should follow, the drill tool must be oriented so that forward pressure on the drill tool will steer the drill tool along the calculated path. At a block 106, the program determines the orientation of the drill tool from the triaxial magnetometer and triaxial accelerometer signals. The orientation of the drill tool includes the instantaneous heading, inclination, and roll of the drill tool. At a block 108, the program determines a desired roll of the drill tool so that the inclined face of the drill head is pointed in a desired direction. At a block 110, the drill string is rotated to bring the drill tool to the desired roll. It will be appreciated that the step represented by block 110 will only be necessary if the calculated path requires the drill tool to change directions. If the drill tool is to continue in a straight line, the drill string will be rotated during the drilling phase to advance the borehole in a linear path. After the drill tool has been properly oriented, at a block 112 the drill tool is advanced along the calculated path during the drilling phase of the directed drilling operation.

Following the drilling phase, the position of the drill tool is determined during the locating phase. At a block 114, the program calculates the new drill tool position $(X_c, Y_c, Z_c)$ from the initial orientation of the drill tool and the distance the drill tool has traveled as indicated by the number of additional drill pipes added to the drill string. In a preferred embodiment of the program, an operator will monitor and enter the length added to the drill string between locating phases.

At a decision block 116, the program determines whether the drill tool position should be corrected. The period between correction of the calculated position of the drill tool to the actual position of the drill tool is selected by the operator of the system. In general, a shorter period will be required if it is found that the actual drill tool path diverges quickly from the calculated path. Such rapid divergence may be caused by environmental drilling conditions such as stray magnetic fields or interference from surrounding signal sources. In contrast, if an operator finds that the divergence of the actual path from the calculated path is fairly slow, the correction of the calculated position may be made infrequently. The maximum error allowable in the drilling path will also determine the period between correction of the calculated position.

If the drill tool position is not corrected, the program returns to block 104 where the calculated drill tool position is used to recompute the calculated path for the next drilling phase. If the drill tool position is to be corrected, however, the program proceeds to a block 118. At block 118, the drilling control system 100 receives the actual drill tool location as transmitted by an operator using locator 100. Locator 35 accurately determines the depth of the drill tool as well as the lateral divergence of the drill tool from the desired path. At a block 120, the program updates the calculated drill tool position to reflect the actual position of the drill tool as determined by the locator. In a preferred embodiment of the invention, only the lateral displacement (X coordinate) and the depth (Z coordinate) of the drill tool position are updated. It will be appreciated, however, that the distance of the drill tool from the boring machine could also be updated by measuring the distance between the locator and the boring machine. After updating the calculated drill tool position, the program returns to block 104 to recompute the calculated path for the next drilling phase. By periodically determining the actual tool position, program 100 effectively removes accumulated integration error from the calculated drill tool path.

Although the navigation technique using the magnetic solenoid transmitter with a walkover locator is highly accurate, it is also relatively slow. By navigating and only periodically using the locator to remove errors generated by the primary navigation package, the speed and accuracy of the directional drilling process is optimized.

Further, devices that generate a signal to guide or locate a boring device, wherein such devices can be enhanced by the use of a longer magnetic solenoid transmitter or an at least two magnetic solenoid transmitters co-axially aligned to form on magnetic solenoid transmitter of the present invention, are also within the scope of the invention. Each of the following patents is expressly incorporated by reference: U.S. Pat. No. 5,320,180 to Sharewell, U.S. Pat. No. 6,035,951 to Digital Control Inc., U.S. Pat. No. 4,881,083 to Flowmole, U.S. Patent No. 5,515,442 to Mercer, and U.S. Pat. No. 4,806,869 to Flowmole.

The embodiments of the invention in which an exclusive property or privilege is claimed are defined as follows:

1. A wireless guidance system for accurately locating an in-ground boring device, the wireless electronic guidance system comprising:
   (a) an in-ground boring device;
   (b) a signal processor for processing guidance data;
   (c) a guidance package coupled to said boring device and comprising a signal generator for generating a set of guidance signals indicative of the location of the in-ground boring device; and
   (d) a first magnetic solenoid transmitter for transmitting the guidance signals from the guidance package coupled to the in-ground boring device to the signal processor, wherein the first magnetic solenoid transmitter transmits the guidance signals at least 100 feet at an input power of at least 0.2W and less than 1.2W.

2. The wireless guidance system of claim 1, further comprising a second magnetic solenoid transmitter co-axially aligned with the first magnetic solenoid transmitters.

3. The wireless guidance system of claim 1, wherein the first and second magnetic solenoid transmitters are at least eight inches in length.

4. A wireless guidance system for accurately locating an in-ground boring device having a length, the guidance system comprising:
   (a) the in-ground boring device;
   (b) a signal processor for processing guidance data;
   (c) a guidance package coupled to said boring device and comprising a signal generator for generating a set of guidance signals indicative of the location of the in-ground boring device; and
   (d) a first magnetic solenoid transmitter co-axially aligned to a second magnetic solenoid transmitter for transmitting the set of guidance signals from the guidance package coupled to the in-ground boring device to the signal processor, wherein the two magnetic solenoid transmitters transmit the set of guidance signals at least 100 feet.

5. The wireless guidance system of claim 4, wherein the first magnetic solenoid transmitter and the second magnetic solenoid transmitter are each at least eight inches in length.

6. A guidance system for accurately locating an in-ground boring device, the wireless electronic guidance system comprising:
   (a) a signal processor for processing guidance data;
   (b) guidance package for locating said boring device and comprising a signal generator for generating a set of guidance signals indicative of the location of the in-ground boring device; and
   (c) a magnetic solenoid transmitter for transmitting the guidance signals from the guidance package coupled to the in-ground boring device to the signal processor, wherein the magnetic solenoid transmitter transmits the guidance signals at least 100 feet at an input power of at least 0.2W and less than 1.2W.

7. The wireless guidance system of claim 6, wherein the magnetic solenoid transmitter is at least eight inches long.

8. The guidance system in claim 7, wherein the magnetic solenoid transmitter comprises at least two co-axially aligned magnetic solenoid transmitters operating as one single, in phase transmitter.

9. A guidance system for accurately locating an in-ground boring device, the guidance system comprising:
   (a) a signal processor for processing guidance data;
   (b) a primary guidance package coupled to said boring device and comprising a first signal generator for generating a first set of signals indicative of the position of the in-ground boring device; and
   (c) a secondary guidance package coupled to said boring device and comprising a second signal generator for generating a second set of signals indicative of the position of the boring device, wherein the secondary guidance package both transmits the first set of signals from the primary guidance package and the second set of signals from the secondary guidance package, wherein the secondary guidance package transmits both the first set of signals and the second set of signals a distance of at least 100 feet at an input power of at least 0.2W and less than 1.2W.

10. The guidance system of claim 9, wherein the secondary guidance package comprises a first magnetic solenoid transmitter.

11. The guidance system of claim 10, wherein the first magnetic solenoid transmitter has a field strength and a length such that the first magnetic solenoid transmitter has a predetermined length to increase the field strength as the length increases.

12. The guidance system of claim 11, wherein the first magnetic solenoid transmitter has a predetermined length of at least eight inches.

13. The guidance system of claim 9, further comprising a second magnetic solenoid transmitter co-axially aligned with the first magnetic solenoid transmitters.

14. The guidance system of claim 13, wherein said second magnetic solenoid transmitter is at least eight inches in length.

15. An guidance system for accurately locating an in-ground boring device, the guidance system comprising:
   (a) a data processor for processing guidance data;
   (b) a primary guidance package for generating a primary guidance signal comprising:
      (i) a triaxial accelerometer located in said boring device and producing a first set of data signals representative of a rotation of said boring device;
      (ii) a triaxial magnetometer located in said boring device and producing a second set of data signals representative of a strength of a magnetic field intersecting the triaxial magnetometer in said boring device; and
   (c) a secondary guidance package comprising:
      (i) a magnetic solenoid transmitter located in said boring device for generating an electromagnetic field having a predetermined radiation pattern;
      (ii) a locator for detecting the electromagnetic field emitted from the magnetic solenoid transmitter and for determining an actual position of the magnetic solenoid transmitter by measuring the strength of the received electromagnetic field;
   wherein the magnetic solenoid transmitter both:
      (i) transmits the primary guidance signal, and
      (ii) emits the electromagnetic field for locating the actual position of the electromagnetic field generator, wherein the magnetic solenoid transmitter both transmits the primary guidance package signal and emits the electromagnetic signal a distance of at least 100 feet at an input power of at least 0.2W and less than 1.2W.

16. The guidance system of claim 15, wherein the magnetic solenoid transmitter is at least eight inches.

17. The guidance system of claim 15, wherein the transmitter comprises at least two co-axially aligned magnetic solenoid transmitters operating as one single, in phase transmitter.

18. The guidance system of claim 17, wherein each of the at least two co-axially aligned magnetic solenoid transmitters are at least eight inches in length.

19. A guidance system for accurately locating an in-ground boring device, the guidance system comprising:
   (a) a signal processor for processing guidance data;
   (b) a primary guidance package for generating a primary guidance signal comprising:
      (i) a triaxial accelerometer located in said in-ground boring device and producing a first set of data signals representative of a rotation of said in-ground boring device;
      (ii) a triaxial magnetometer located in said in-ground boring device and producing a second set of data signals representative of a strength of a magnetic field intersecting the triaxial magnetometer in said boring device; and
   (c) a secondary guidance package comprising:
      (i) a first magnetic solenoid transmitter located in said boring device for generating an electromagnetic field having a predetermined radiation pattern;
      (ii) a locator for detecting the electromagnetic field emitted from the magnetic solenoid transmitter and for determining an actual position of the magnetic solenoid transmitter by measuring the strength of the received electromagnetic field; and
   wherein the magnetic solenoid transmitter both:
      (i) transmits the primary guidance signal, and
      (ii) emits the electromagnetic field for locating the actual position of the magnetic solenoid transmitter,
   wherein the magnetic solenoid transmitter has a length of at least eight inches, and the magnetic solenoid transmitter both transmits the primary guidance package signal and emits the electromagnetic field a distance of at least 100 feet at an input power of at least 0.2W and less than 1.2W.

20. The guidance system of claim 19, further comprising a second magnetic solenoid transmitter operating as one single, in phase transmitter.

21. The guidance system of claim 20, wherein each of the at least two co-axially aligned magnetic solenoid transmitters are at least eight inches in length.

22. A wireless electronic guidance system for accurately locating an in-ground boring device, the wireless electronic guidance system comprising:
   (a) a signal processor for processing guidance data;
   (b) a primary guidance package comprising:
      (i) a triaxial accelerometer located in said boring device and producing a first set of data signals representative of a rotation of said boring device;
      (ii) a triaxial magnetometer located in said boring device and producing a second set of data signals representative of a strength of a magnetic field intersecting the triaxial magnetometer in said boring device; and
   (c) a secondary guidance package for generating a primary guidance signal comprising:
      (i) a magnetic solenoid transmitter located in said boring device for generating an electromagnetic field having a predetermined radiation pattern;
      (ii) a locator for detecting the electromagnetic field emitted from the magnetic solenoid transmitter and for determining an actual position of the magnetic solenoid transmitter by measuring the strength of the received electromagnetic field; and
   wherein the magnetic solenoid transmitter both:
      (i) transmits the primary guidance package signal, and
      (ii) emits an electromagnetic field for locating the actual position of the electromagnetic generator,
   wherein the transmitter is suitable for transmitting both the primary guidance package signal and the secondary guidance package signal a distance of at least 100 feet at an input power of at least 0.2W and less than 1.2W, wherein the transmitter is a magnetic solenoid transmitter comprising at least two co-axially aligned magnetic solenoid transmitters operating as a single, in phase transmitter.

23. The guidance system of claim 22 wherein each of the at least two magnetic solenoid transmitters are at least eight inches in length.

24. An guidance system for accurately locating an in-ground boring device, the guidance system comprising:
   (a) a means processing guidance data;
   (b) a primary guidance package for generating a primary guidance signal comprising:
      (i) a means for producing a first set of data signals located in said boring device said first set of data signals representative of a rotation of said in-ground boring device;
      (ii) a means for producing a second set of data signals located in said in-ground boring device and said second set of data signals representative of a strength of a magnetic field intersecting the means for producing a second set of data signals in said boring device; and
   (c) a secondary guidance package comprising:
      (i) means for generating an electromagnetic field located in said boring device having a predetermined radiation pattern;
      (ii) means for locating the electromagnetic field emitted from the generating means and for determining an actual position of the means for generating an electromagnetic field by measuring the strength of the received electromagnetic field;
   wherein the means for generating an electromagnetic field both:
      (i) transmits the primary guidance signal, and
      (ii) emits the electromagnetic field for locating the actual position of the generating means,
   wherein the means for generating an electromagnetic field both transmits the primary guidance package signal and emits the electromagnetic field a distance of at least 100 feet at an input power of at least 0.2W and less than 1.2W.

25. A guidance system for accurately locating an in-ground boring device, the guidance system including:
   (a) a signal processor for processing guidance data;
   (b) a primary guidance package for generating a primary guidance signal comprising:
      (i) a triaxial accelerometer located in said boring device and producing a first set of data signals representative of a rotation of said boring device;
      (ii) a triaxial magnetometer located in said boring device and producing a second set of data signals representative of a strength of a magnetic field intersecting the triaxial magnetometer in said boring device; and (c) a secondary guidance package comprising:
  (i) an electromagnetic field generator located in said boring device for generating an electromagnetic field having a predetermined radiation pattern;
  (ii) a locator for detecting the electromagnetic field emitted from the electromagnetic field generator and for determining an actual position of the electromagnetic field generator by measuring the strength of the received electromagnetic field; the improvement comprising:

wherein the electromagnetic field generator is a magnetic solenoid transmitter that both:
  (i) transmits the primary guidance signal, and
  (ii) emits an electromagnetic field for locating the actual position of the electromagnetic field generator, wherein the magnetic solenoid transmitter has a length of at least eight inches, and the magnetic solenoid transmitter both transmits the primary guidance package signal and the electromagnetic field a distance of at least 100 feet at an input power of at least 0.2W and less than 1.2W.

26. A guidance system for accurately locating an in-ground boring device, the guidance system comprising:
(a) a signal processor for processing guidance data;
(b) a primary guidance package for generating a primary guidance signal comprising:
  (i) a triaxial accelerometer located in said boring device and producing a first set of data signals representative of a rotation of said boring device;
  (ii) a triaxial magnetometer located in said boring device and producing a second set of data signals representative of a strength of a magnetic field intersecting the triaxial magnetometer in said boring device; and
(c) a secondary guidance package comprising:
  (i) a magnetic solenoid transmitter located in said boring device for generating an electromagnetic field having a predetermined radiation pattern;
  (ii) a locator for detecting the electromagnetic field emitted from the magnetic solenoid transmitter and for determining an actual position of the magnetic solenoid transmitter by measuring the strength of the received electromagnetic field;

wherein the magnetic solenoid transmitter both:
  (i) transmits the primary guidance signal, and
  (ii) emits a secondary guidance package signal comprising a signal for locating the actual position of the electromagnetic field generator, wherein the transmitter is a magnetic solenoid transmitter comprising at least two co-axially aligned magnetic solenoid transmitters operating as one single, in phase magnetic solenoid transmitter.

27. The guidance system of claim 26 wherein the at least two co-axially align magnetic solenoid transmitters are each at least eight inches in length.

28. A wireless method of accurately guiding an in-ground boring device along a predetermined borehole path by monitoring the location of the in-ground boring device, the boring device containing a primary guidance package containing a signal generator for generating a first set of signals indicative of the position of the boring device and a secondary guidance package containing a signal generator for generating a second set of signals indicative of the position of the boring device, the method comprising the steps of:
(a) receiving the first set of signals indicative of the position of the boring device from a magnetic solenoid transmitter having a length of at least eight inches;
(b) calculating a first position of the boring device; and
(c) guiding the boring device along the predetermined borehole path based on the calculated first position, the first position being periodically cleared of accumulated error by:
  (i) receiving the second set of signals indicative of the position of the boring device from the magnetic solenoid transmitter having a length of at least eight inches;
  (ii) calculating a second position of the boring device; and
  (iii) setting the first position of the boring device equal to the second position of the boring device to remove any error present in the first position.

29. A wireless method of accurately guiding an in-ground boring device along a predetermined borehole path by monitoring the location of the in-ground boring device, the boring device containing a primary guidance package comprising a triaxial magnetometer and a triaxial accelerometer and a secondary guidance package comprising a magnetic solenoid transmitter for emitting an electromagnetic field having a predetermined radiation pattern and a locator for determining a position of the magnetic solenoid transmitter by measuring a strength of the electromagnetic field emitted from the magnetic solenoid transmitter at a point distant from the magnetic solenoid transmitter, the method comprising the steps of:
(a) receiving a first set of data signals from said triaxial magnetometer indicative of a magnetic field intersecting the triaxial magnetometer and a second set of data signals from said triaxial accelerometer indicative of a rotation of said boring device from a magnetic solenoid transmitter having a length of at least eight inches;
(b) calculating a first position of the boring device from the first set of data signals, and the second set of data signals; and
(c) guiding the boring device based on the calculated first position, the first position being periodically corrected of an accumulated error by:
  (i) determining a second position of the boring device by using the locator to receive the electromagnetic field emitted from the magnetic solenoid transmitter having a length of at least eight inches to determine the position of the magnetic solenoid transmitter; and
  (ii) setting the first position equal to the second position.

30. A method of accurately guiding an in-ground boring device along a predetermined borehole path by monitoring the location of the in-ground boring device, the boring device containing a primary guidance package containing a signal generator for generating a first set of signals indicative of the position of the boring device and a secondary guidance package containing a signal generator for generating a second set of signals indicative of the position of the boring device, the method comprising the steps of:
(a) receiving the first set of signals indicative of the position of the boring device from a magnetic solenoid transmitter comprising at least two co-axially aligned magnetic solenoid transmitters operating as one, single in phase magnetic solenoid transmitter;

(b) calculating a first position of the boring device; and (c) guiding the boring device along the predetermined borehole path based on the calculated first position, the first position being periodically cleared of accumulated error by:

(i) receiving the second set of signals indicative of the position of the boring device from the magnetic solenoid transmitter comprising at least two co-axially aligned magnetic solenoid transmitters operating as one, single in phase transmitter;

(ii) calculating a second position of the boring device; and (iii) setting the first position of the boring device equal to the second position of the boring device to remove any error present in the first position.

* * * * *